United States Patent [19]

Hellouin de Menibus

[11] Patent Number: 4,461,180

[45] Date of Patent: Jul. 24, 1984

[54] APPARATUS FOR PROTECTING DIFFERENTIAL PRESSURE MEASUREMENT APPARATUS AGAINST EXCEEDING A MAXIMUM ALLOWABLE DIFFERENTIAL PRESSURE

[75] Inventor: Olivier Hellouin de Menibus, Etampes, France

[73] Assignee: Appareillages et Materiels de Servitudes (A.M.S.), Fresnes, France

[21] Appl. No.: 342,731

[22] Filed: Jan. 26, 1982

[30] Foreign Application Priority Data

Jan. 27, 1981 [FR] France ................ 81 01436

[51] Int. Cl.³ .......................................... G01L 19/06
[52] U.S. Cl. ..................................... 73/706; 73/716; 73/736
[58] Field of Search ............. 73/706, 716, 717, 718, 73/719, 720, 721, 722, 736

[56] References Cited

U.S. PATENT DOCUMENTS

| | | | |
|---|---|---|---|
| 2,558,534 | 6/1951 | Bentley | 73/389 |
| 2,627,183 | 2/1953 | Greenwood, Jr. et al. | 73/716 X |
| 2,981,110 | 4/1961 | Fenn et al. | 73/716 |
| 3,290,945 | 12/1966 | Li et al. | 73/716 |
| 3,712,143 | 1/1973 | Weaver et al. | 73/720 |
| 3,718,048 | 2/1973 | Nolte | 73/716 |
| 3,756,085 | 9/1973 | Hunter | 73/720 |
| 4,135,407 | 1/1979 | Ezekiel | 73/706 X |

FOREIGN PATENT DOCUMENTS

| | | | |
|---|---|---|---|
| 649344 | 9/1962 | Canada | 73/706 |
| 56913 | 8/1982 | European Pat. Off. | 73/706 |
| 2556285 | 6/1977 | Fed. Rep. of Germany | 73/716 |
| 1042197 | 10/1953 | France . | |
| 2422153 | 11/1979 | France . | |
| 2445521 | 7/1980 | France . | |
| 1566703 | 5/1980 | United Kingdom . | |
| 620856 | 7/1978 | U.S.S.R. | 73/706 |

Primary Examiner—S. Clement Swisher
Assistant Examiner—Tom Noland
Attorney, Agent, or Firm—Sandler & Greenblum

[57] ABSTRACT

An apparatus for protecting a pressure differential sensor from exceeding a maximum allowable pressure differential. The apparatus has a housing which has a low-pressure chamber and a high-pressure chamber. A pressure-sensitive member separates the high-pressure chamber and the low-pressure chamber from one another. A blocking member is provided for blocking the entrance of fluid into the high-pressure chamber in response to the pressure-sensitive member sensing an initial differential pressure between the high-pressure chamber and the low-pressure chamber which exceeds the maximum allowable differential pressure. There may also be provided equilibration structure for creating a hysteresis loop as to the magnitude of the pressure differential between the high-pressure chamber and the low-pressure chamber. The equilibration structure allows communication between the high-pressure chamber and the low-pressure chamber in response to the pressure-sensitive member sensing a further increase in the pressure differential between the high-pressure chamber and the low-pressure chamber after the blocking member has blocked the high-pressure chamber inlet orifice, and shuts off this communication when the pressure differential between the high-pressure and low-pressure chamber drops to a level slightly less than the maximum allowable differential pressure.

22 Claims, 3 Drawing Figures

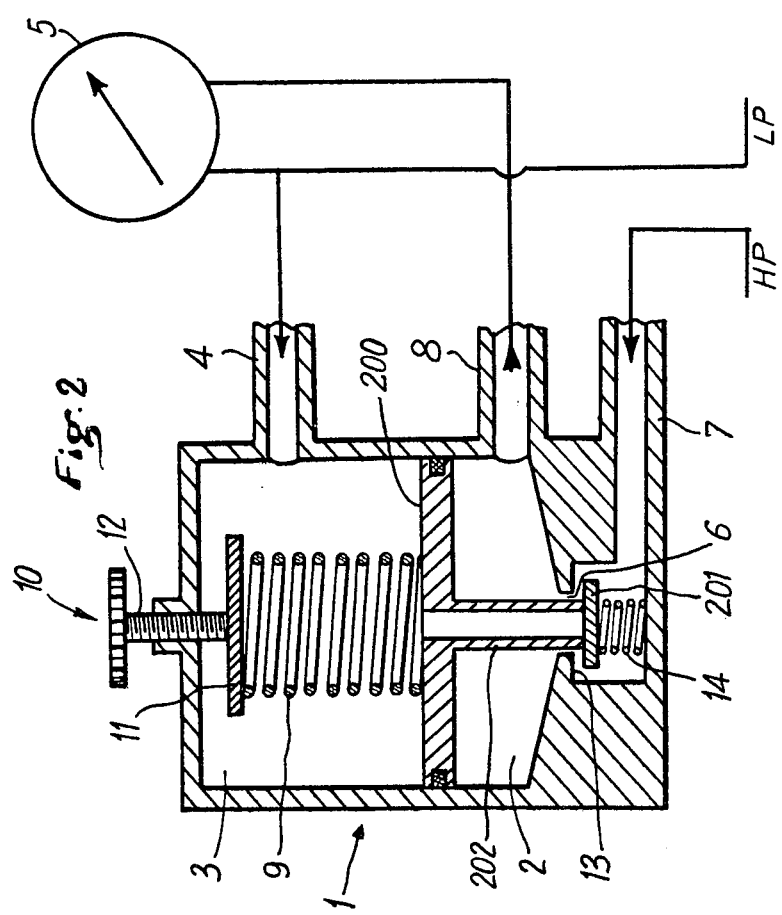

APPARATUS FOR PROTECTING DIFFERENTIAL PRESSURE MEASUREMENT APPARATUS AGAINST EXCEEDING A MAXIMUM ALLOWABLE DIFFERENTIAL PRESSURE

BACKGROUND OF THE INVENTION

1. Field of the Invention

The present invention relates generally to apparatus for protecting a sensor or manometer, and, more particularly, to an apparatus for protecting a pressure differential sensor from exceeding a maximum allowable pressure differential.

2. Description of the Prior Art

The prior art discloses a system in which a flap valve is maintained open by a back pressure which is selected such that the flap valve can close the upstream circuit when the pressure in the circuit becomes greater than the back pressure, thus assuring protection of an absolute pressure sensor positioned downstream.

Unlike absolute pressure sensors, differential pressure sensors or differential manometers are adapted to measure a difference in pressure between two fluids. It is possible to protect the high-pressure circuit against overloads, by a system of the type described above. It is not possible, however, with this type of protection system, to safeguard the sensor against a differential pressure which is so great that it would present the risk of damaging the sensor.

Differential sensors are generally made of very costly materials. Protecting them is particularly delicate, because it is necessary to take into account not a pressure, but the difference between two pressures.

SUMMARY OF THE INVENTION

According to the present invention, protection of a pressure differential sensor from exceeding a maximum allowable pressure differential is provided by an apparatus which has a housing having a low-pressure chamber and a high-pressure chamber. The apparatus also has a pressure-sensitive member separating the high-pressure chamber and the low-pressure chamber from one another. There is also provided means for blocking the entrance of fluid into the high-pressure chamber in response to the pressure-sensitive member sensing an initial differential pressure between the high-pressure chamber and the low-pressure which exceeds the maximum allowable differential pressure. There may also be provided equilibration means for creating a hysteresis loop as to the magnitude of the differential pressure between the high-pressure chamber and the low-pressure chamber. The equilibration means allows communication between the high-pressure chamber and the low-pressure chamber in response to the pressure-sensitive member sensing a further increase in the differential pressure between the high-pressure chamber and the low-pressure chamber after the blocking means has blocked the high-pressure chamber inlet orifice, and shuts off this communication when the differential pressure between the high-pressure chamber and the low-pressure chamber drops to a level slightly less than the maximum allowable differential pressure.

More specifically, according to the present invention, protection of a pressure differential sensor from exceeding a maximum allowable pressure differential is provided by an apparatus which has a housing having a low-pressure chamber which includes a low-pressure inlet orifice for connection with a low-pressure line which is fed into the sensor, and a high-pressure chamber which includes both a high-pressure inlet orifice for connection with a high-pressure line and a high-pressure outlet orifice for connection with the sensor. The apparatus also has a pressure-sensitive member for separating the low-pressure and high-pressure chambers from one another. There are also provided blocking means for regulating the fluid flow through the high-pressure inlet orifice, and back-pressure means for biasing the pressure-sensitive member toward the high-pressure chamber, and for biasing the blocking means away from the high-pressure inlet orifice. The back-pressure means applies a back pressure which is substantially equal to the maximum pressure differential allowed by the sensor. The apparatus operates such that the high-pressure inlet orifice is unblocked when the pressure differential between the high-pressure and low-pressure lines does not exceed the biasing pressure applied by the back-pressure means. In addition, when the pressure differential between the high-pressure and low-pressure lines exceeds the biasing pressure of the back-pressure means, the blocking means blocks the high-pressure inlet orifice. The apparatus further includes valve means for regulating the fluid flow between the high-pressure chamber and the low-pressure chamber. The valve means is biased closed by the back-pressure means when the pressure differential between the high-pressure and low-pressure lines does not exceed the biasing pressure applied by the back-pressure means. The valve means is adapted such that it cannot be opened unless the high-pressure inlet orifice is blocked by the blocking means.

The back-pressure means is preferably a spring having adjustable compression, and resting on the pressure-sensitive means.

In addition, the pressure-sensitive means for separating the two chambers may constitute a membrane attached at its periphery in the housing between the high-pressure chamber and the low-pressure chamber, or a piston slidably mounted in the housing between the low-pressure inlet orifice and the high-pressure outlet orifice such that the piston seals the high-pressure chamber and the low-pressure chamber from one another, or a metallic bellows.

According to one embodiment of the present invention, there is provided a pressure-sensitive member which has a substantially central aperture. A tubular pushbutton is attached at one end to the pressure-sensitive member coaxially with the central aperture and projects into the high-pressure chamber. Back-pressure means acts on the pressure-sensitive member, to bias the free end of the pushbutton against the blocking means to tend to push the blocking means away from the high-pressure inlet orifice against the pressure applied in the opposite direction by a forward-pressure means. When the pressure dfferential between the high-pressure chamber and the low-pressure chamber does not exceed the biasing pressure applied by the back-pressure means, the blocking means does not block the high-pressure inlet orifice, but when the pressure differential exceeds the biasing pressure applied by the back-pressure means, the blocking means blocks the high-pressure inlet orifice. After the blocking means blocks the high-pressure inlet orifice, a decrease of the low pressure causes (1) the pushbutton to separate from the blocking means, (2) the pressures in the high-pressure and low-pressure chambers to equilibrate, and (3) the pushbutton to make renewed contact with the blocking means, while an increase in the low pressure or a decrease in the high pressure causes the high-pressure inlet orifice to reopen.

According to another embodiment of the invention, there is provided a pressure-sensitive member which has a substantially central aperture. A second blocking means is disposed in the low-pressure chamber for blocking the substantially central aperture of the pressure-sensitive member. The second blocking means has an elongated member or extension which is attached at one end to the second blocking means, and which projects into the high-pressure chamber. The extension is attached at its other end to a first blocking means. Back-pressure means biases the substantially central aperture of the pressure-sensitive means towards said second blocking means to close the central aperture, and biases the first blocking means away from the high-pressure inlet orifice against the pressure applied in the opposite direction by a forward-pressure means. When the pressure differential between the high-pressure chamber and the low-pressure chamber does not exceed the biasing pressure applied by the back-pressure means, the central aperture will be closed by the second blocking means, and the high-pressure inlet orifice will be open. When the pressure differential exceeds the biasing pressure applied by the back-pressure means, the first blocking means will close the high-pressure inlet orifice. After the high-pressure inlet orifice is closed, a decrease in the low pressure causes (1) the pressure-sensitive member to separate from the second blocking means, (2) the pressure in the high-pressure and low-pressure chambers to equilibrate, and (3) the pressure-sensitive member to make renewed contact with the second blocking means to close the central aperture, while an increase in the low pressure or a decrease in the high pressure causes the high-pressure inlet orifice to reopen.

The extension which is attached to the first blocking means and the second blocking means preferably slides in a guide attached to the housing.

The embodiment of the invention described above having a tubular pushbutton, and the embodiment of the invention described above having an extension attached between the first and second blocking means, may each be combined with each of the embodiments of the invention described above with respect to the pressure-sensitive member for separating the high-pressure chamber and the low-pressure chamber.

BRIEF DESCRIPTION OF THE DRAWINGS

The present invention will be more fully apparent to those of ordinary skill in the art to which the invention pertains from the following detailed description, when considered in connection with the accompanying drawings, in which one- or two-digit numbers are used to designate identical means in the three Figures, while different means having comparable functions in the three Figures are designated by three-digit reference numbers whose last two digits are identical throughout the several views, while the first digit corresponds to the number of the Figure, and wherein:

FIG. 2 is a sectional view of the apparatus of the present invention taken vertically through the center of the housing, and illustrates the embodiments of the present invention in which the pressure-sensitive member constitutes a piston slidably mounted in the housing between the low-pressure inlet orifice and the high-pressure outlet orifice.

DETAILED DESCRIPTION OF THE PREFERRED EMBODIMENTS

Figure 1:
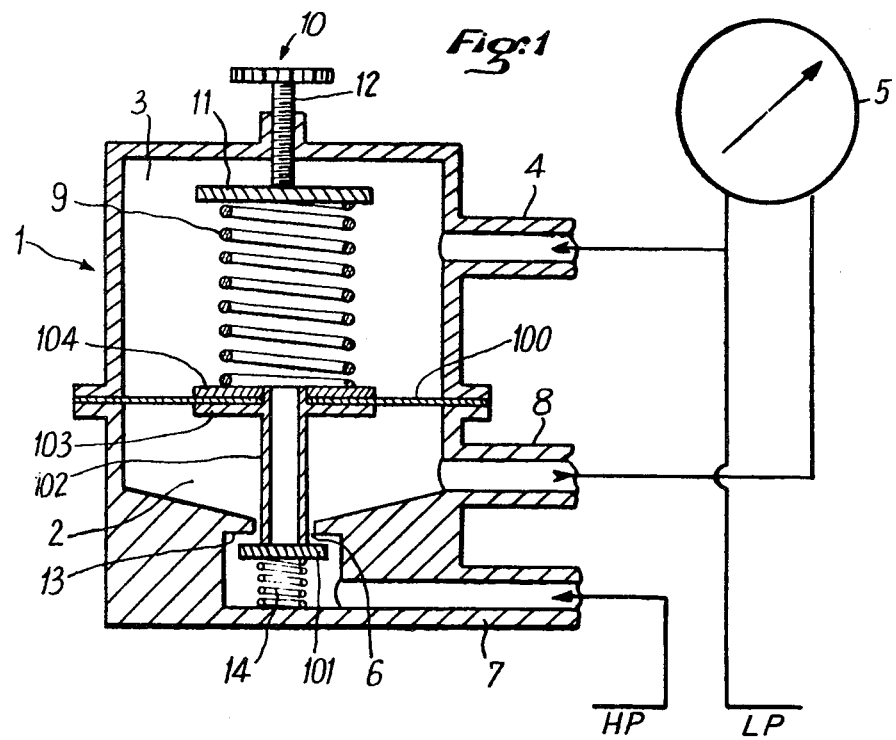
FIG. 1 is a sectional view of the apparatus of the present invention taken vertically through the center of the housing, and illustrates the embodiments of the present invention in which the pressure-sensitive member constitutes a membrane attached at its periphery in the housing between the high-pressure chamber and the low-pressure chamber.
Figure 3:
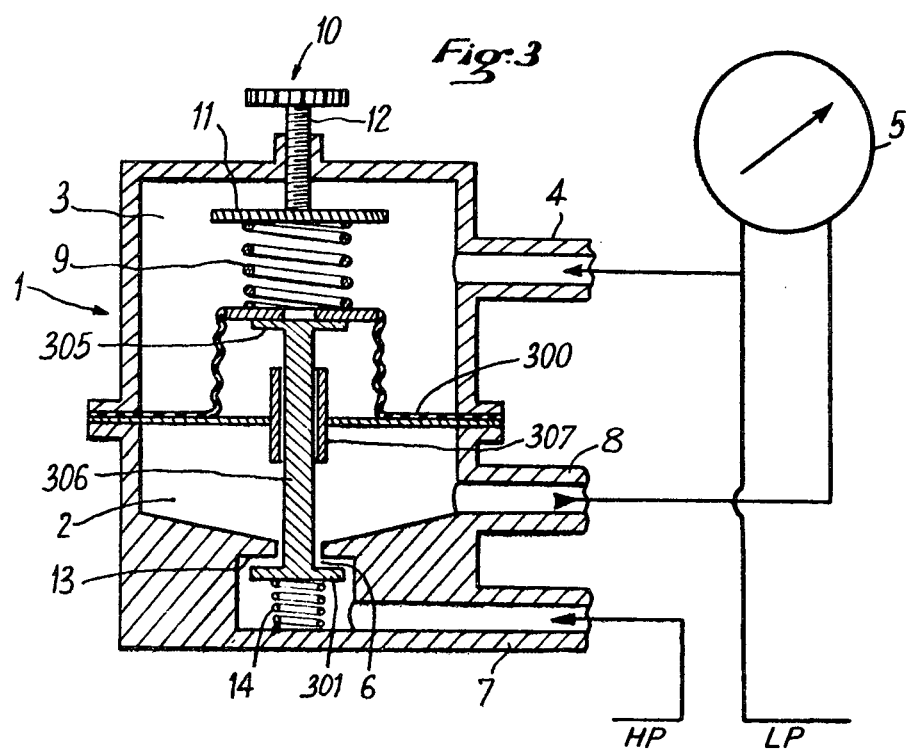
FIG. 3 is a sectional view of the apparatus of the present invention taken vertically through the center of the housing, and illustrates the embodiments of the present invention in which the pressure-sensitive member constitutes a metallic bellows.

FIGS. 1-3 show an apparatus formed from a housing 1 whose interior is separated by pressure-sensitive means 100, 200, 300 in a manner so as to form a high-pressure chamber 2 and a low-pressure chamber 3. In the following description, "high-pressure" and "low-pressure" will be identified conventionally as "HP" and "LP", respectively. LP chamber 3 is provided with an inlet orifice 4 connected to a shunt along line LP of the circuit, which leads to the sensor 5 to be protected.

The HP chamber 2 has an inlet orifice 6 connected by a conduit 7 to the high-pressure line HP. HP chamber 2 is likewise provided with an outlet orifice 8 connected to the sensor 5. Spring 9 is mounted in the low-pressure chamber 3, which is wedged between pressure-sensitive means 100, 200, 300, and adjustment apparatus 10 for adjusting the compression of the spring. Adjustment apparatus 10 is formed by a plate 11 which is integral with a screw 12 which extends through a conjugated thread of the upper portion of housing 1. At the level of the HP inlet orifice 6, the housing 1 forms a shoulder 13 which constitutes a seat for a flap valve 101, 201, 301. Shoulder 13 is positioned upstream of the HP inlet orifice 6 and is biased toward the HP inlet orifice by a spring 14 wedged in the conduit 7.

In FIG. 1, the pressure-sensitive means is a membrane 100 whose periphery is held between two constitutional portions of the housing 1. Membrane 100 is provided with a central aperture, while a tubular pushbutton 102 is attached to the membrane coaxially with the central aperture, and extends into HP chamber 2. Pushbutton 102 may be formed, for example, by a tube provided with a collar 103 on which membrane 100 rests, while a washer 104, for example, screwed on the end of the pushbutton, secures the assembly. Spring 9 is applied against washer 104, and thus exerts pressure on membrane 100. The free end of bored pushbutton 102 rests, in the position shown, on the flap valve 101.

FIG. 2 illustrates an apparatus very similar to that of FIG 1, with the exception that the pressure-sensitive means constitutes, in this case, a piston 200. Piston 200 is bored at its center, as is membrane 100 shown in FIG. 1, while the central aperture extends through a tubular pushbutton 202. Piston 200 is biased by spring 9 toward the HP chamber 2, and can slide in a sealed manner in housing 1 between LP inlet orifice 4 of LP chamber 3 and HP outlet orifice 8 of HP chamber 2.

FIG. 3 illustrates a structure slightly different from those shown in FIGS. 1 and 2 with respect to the pressure-sensitive means and the blocking flap valves.

The apparatus of FIG. 3 is provided with a metallic bellows 300, secured at its periphery, as is the membrane 100 shown in FIG. 1, in housing 1. Bellows 300 extends into the low-pressure chamber 3, and has a central aperture provided at its apex which, as is seen in FIG. 3, is reinforced. The central aperture of bellows 300 can be blocked by flap valve 305. Flap valve 305 is provided with an extension 306 which is attached at its other end to flap valve 301. Furthermore, this apparatus is provided with a guide 307 attached to the housing 1 to guide the extension 306.

Although the three embodiments shown vary somewhat in detail, it is clear that their operation is similar, as will be seen below. Furthermore, it is important to note that the apparatus shown in FIGS. 1 and 2 can very well be equipped with means 301, 305, 306, and 307 of FIG. 3 instead of means 101, 102, 103, 104, or 201 and 202, respectively. Similarly, the apparatus of FIG. 3 can be equipped with means 101–104 instead of means 301, 305, 306, and 307.

Otherwise stated, the pressure-sensitive means can be, as desired, a membrane 100, a piston 200, or a bellows 300, and the blocking means can, as desired, be a tubular pushbutton 102, 202, combined with a flap valve 101, 201, or two distinct flap valves 301 and 305 connected by elongated member 306.

FIGS. 1–3 illustrate six embodiments in all. From the foregoing description, one skilled in the art can easily ascertain the essential characteristics of this invention, and, without departing from the spirit and scope thereof, can make various changes and modifications of the invention to adapt it to various usages and conditions.

The operation of the apparatus is clear.

Spring 9 is calibrated by adjustment means 10 to exert a back pressure which is substantially equal to the maximum differential between the high pressure and the low pressure allowed by the sensor 5. Spring 14 is a negligible factor, except when the actual pressure differential between the HP and the LP exceeds the back pressure of spring 9.

When the pressure differential is less than the maximum allowable value, flap valve 101, 201, 301, which is biased indirectly by spring 9 away from HP inlet orifice 6, remains open, and sensor 5 normally receives pressures from the high-pressure and low-pressure lines.

However, if the high pressure increases, or the low pressure decreases, in a manner such that the differential of these two pressures becomes greater than the maximum allowable differential, the pressure-sensitive means deforms (membrane 100, bellows 300) or displaces (piston 200) toward the high-pressure chamber 3, such that flap valve 101, 201, 301, biased by spring 14 toward the HP inlet orifice 6, blocks the inlet orifice 6. The closing of flap valve 101, 201, 301 is thus obtained by the pressure which is applied to the pressure-sensitive means, and which causes pushbutton 102, 202 or extension 306, and thus the flap valve, to rise.

It should also be noted that flap valve 101, 201, 301 has a small surface on which pressure is exerted, which tends to close it, and which will be discussed below.

During the closing of flap valve 101, 201, 301, pushbutton 102, 202 (FIGS. 1 and 2) or flap valve 305 (FIG. 3) blocks the central aperture of the pressure-sensitive means by virtue of the bias of spring 14. In this position (flap valve 101, 201, 301 closed), it is clear that the high pressure arriving at sensor 5 is limited, and remains at a predetermined value, even if the pressure of the HP line continues to rise. Still in this position, if the low pressure begins to or continues to drop, the pressure-sensitive means continues to deform (100, 300) or to displace (200), which causes the tubular pushbutton 102, 202 to separate from the flap valve 101, 201, or, respectively, the opening of flap valve 305 due to bellows 300 separating from flap valve 305, such that the high-pressure and low-pressure chambers communicate, which tends to equilibrate the pressures, thus protecting the apparatus 1 from damage due to high pressure.

The passage of the fluid from the high-pressure chamber into th low-pressure chamber causes a diminution of the pressure differential, and causes a reverse movement, from that previously described, of the pressure-sensitive means. This movement causes the closing of the communication between the chambers by the application of pushbutton 102, 202 on flap valve 101, 201, or, respectively, the closing of flap valve 305.

On the other hand, and still beginning with the position where the flap valve 101, 201, 301 is closed, an increase in the low pressure, or a decrease in the high pressure, causes the reopening of the inlet orifice of the high-pressure chamber due to the fact that the pressure differential will have diminished below the back pressure applied by spring 9.

In effect, an increase in the low pressure causes a deformation or a displacement of the pressure-sensitive means towards the high-pressure chamber, and thus an opening of flap valve 101, 201, 301, while a decrease of the high pressure causes a bias due to a lower pressure on the flap valve 101, 201, 301, and thus an opening thereof. That is, such an opening will occur when this pressure differential is sufficient to overcome the upward bias of a spring 14 on flap valve 101, 201, 301. When this happens, sensor 5 is again in direct communication with the high-pressure and low-pressure lines until a new too-substantial pressure differential again causes the above operation to occur.

Furthermore, equilibrating means in the apparatus shown in FIGS. 1–3 creates a hysteresis loop between the closing of pushbutton 102, 202 with flap valve 101, 202 in FIGS. 1 and 2, and between bellows 300 and flap valve 305 in FIG. 3, and the placement in communication of the HP and LP chambers. This, in turn, creates a hysteresis loop as to the magnitude of the differential pressure between the high-pressure chamber and the low-pressure chamber. The hysteresis loop is created only after the flap valve 101, 201, 301 has blocked the HP inlet orifice 6 and protects the apparatus from possible damage should the pressure in the LP line drop significantly while flap valve 101, 201, 301 is closed. In effect, in the embodiments shown in FIGS. 1 and 2, a decrease in the LP causes a separation between the flap valve and the free end of the pushbutton, resulting in movement toward equilibration of the pressures in the HP and LP chambers and renewed contact between the free end of the pushbutton and the flap valve. Similarly, in the embodiment shown in FIG. 3, a decrease of the LP causes the pressure-sensitive means to separate from flap valve 305, and thus the central aperture to open, and the pressure in the two chambers to tend to equilibrate, and subsequently, the central aperture to re-close. That is, for a differential pressure slightly greater than the back pressure exerted by spring 9, the pressures exerted by the fluids on the pressure-sensitive members cause the flap valve to open, and the communication of the chambers results in a differential pressure equal to the back pressure of spring 9, resulting in spring 9, in the embodiment shown in FIGS. 1 and 2, pushing pressure-sensitive means 100, 200 such that pushbutton 102, 202 makes renewed contact with flap valve 101, 102, and, in the embodiment shown in FIG. 3, pushes pressure-sensitive means 300 such that it makes renewed contact with flap valve 305.

Without departing from the spirit and scope of the present invention, one can make numerous modifications of the invention to adapt it to various usages and conditions. These modifications or variations can particularly relate to the pressure-sensitive member and the blocking means. The blocking means can be formed by two flap valves, as in FIG. 3, or a double flap valve, as in FIGS. 1 and 2, or otherwise. Similarly, the configuration and the shape of the housing 1 can be varied, and the back-pressure means, which is shown as a spring 9, can be replaced by a small, sealed, inflated chamber, which is inflated by nitrogen, for example.

It is also possible to provide other elements, such as an indicator for indicating the operation of the protection apparatus, by means, for example, of a closing indicator for flap valve 101, 201, 301.

The embodiments will generally be selected as a function of the pressures of the fluids encountered, with the embodiments of FIGS. 2 and 3 being more particularly adapted to elevated pressures, and to corrosive fluids.

Finally, it is likewise possible to equip a circuit with a plurality of sensors and with a plurality of protection apparatus whose sensitivities are different.

What is claimed is:

1. An apparatus for protecting a pressure differential sensor against exceeding a maximum allowable pressure differential comprising:
    (a) a housing having a low-pressure chamber which includes a low-pressure inlet orifice for connection with a low-pressure line which is fed into the sensor, and a high-pressure chamber which includes both a high-pressure inlet orifice for connection with a high-pressure line and a high-pressure outlet orifice for connection with the sensor;
    (b) a pressure-sensitive member separating said low-pressure and high-pressure chambers from one another;
    (c) blocking means for regulating fluid flow through said high-pressure inlet orifice;
    (d) back-pressure means for biasing said pressure-sensitive member towards said high-pressure chamber and for biasing said blocking means away from said high-pressure inlet orifice by applying a back pressure which is substantially equal to the maximum pressure differential whereby said high-pressure inlet orifice is unblocked when the pressure differential between the high-pressure and low-pressure lines does not exceed the biasing pressure applied by said back-pressure means, and whereby when the pressure differential between the high-pressure and low-pressure lines exceeds the biasing pressure of said back-pressure means, said blocking means blocks said high-pressure inlet orifice; and
    (e) valve means for regulating the fluid flow between said high-pressure chamber and said low-pressure chamber, said valve means being biased closed by said back-pressure means when the differential pressure between the high-pressure and the low-pressure lines does not exceed the biasing pressure applied by said back-pressure means, and adapted such that it cannot be opened unless said high-pressure inlet orifice is blocked by said blocking means.

2. Apparatus as recited in claim 1 further comprising forward-pressure means for biasing said blocking means towards said high-pressure inlet orifice.

3. Apparatus as recited in claim 2 wherein said back-pressure means comprises first resilient means which rests on said pressure-sensitive member, and said forward-pressure means comprises second resilient means which rests on said blocking means, the bias applied by said second resilient means being negligible in comparison with that applied by said first resilient means, such that said first resilient means will bias said blocking means open when the pressure differential between the high-pressure and low-pressure lines does not exceed the biasing pressure applied by said first resilient means.

4. Apparatus as recited in claim 3 wherein said first resilient means comprises a first spring which has an adjustable compression and said second resilient means comprises a second spring.

5. Apparatus as recited in claim 2 wherein said blocking means comprises a first flap valve.

6. Apparatus as recited in claim 5 wherein said pressure-sensitive member comprises a flexible membrane attached in said housing between said high-pressure chamber and said low-pressure chamber.

7. Apparatus as recited in claim 5 wherein said pressure-sensitive member comprises a piston slidably mounted in said housing between said high-pressure chamber and said low-pressure chamber such that said piston seals said high-pressure chamber and said low-pressure chamber from one another.

8. Apparatus as recited in claim 6 or 7 wherein said pressure-sensitive member has a substantially central aperture, and there is provided a tubular pushbutton attached at one end to said pressure-sensitive member coaxially with said central aperture, and projecting into said high-pressure chamber, said back-pressure means acting on said pressure-sensitive means to bias the free end of said pushbutton against said first flap valve to tend to push it away from said high-pressure inlet orifice against the pressure applied in the opposite direction by said forward-pressure means, whereby when the pressure differential between said high-pressure chamber and said low-pressure chamber does not exceed the biasing pressure applied by said back-pressure means, said first flap valve does not block said high-pressure inlet orifice, but when the pressure differential between said high-pressure chamber and said low-pressure chamber exceeds the biasing pressure applied by said back-pressure means, said first flap valve blocks said high-pressure inlet orifice, and whereby after said first flap valve blocks said high-pressure inlet orifice, a decrease of the low pressure causes (1) said pushbutton to separate from said first flap valve, (2) the pressure in said high-pressure and low-pressure chambers to equilibrate, and (3) said pushbutton to make renewed contact with said first flap valve, while an increase in the low pressure or a decrease in the high pressure causes said high-pressure inlet orifice to reopen.

9. Apparatus according to claim 5 wherein said pressure-sensitive member comprises a metallic bellows.

10. Apparatus as recited in claim 9 wherein said pressure-sensitive member has a substantially central aperture, and there is provided a second flap valve disposed in said low-pressure chamber for blocking said substantially central aperture, said second flap valve including an extension which is attached at one end to said second flap valve and at its other end to said first flap valve, said back-pressure means biasing said substantially central aperture of said pressure-sensitive member towards said second flap valve to tend to close said aperture and biasing said first flap valve away from said high-pressure inlet orifice against the pressure applied in the opposite direction by said forward-pressure means, whereby when the pressure differential between said high-pressure chamber and said low-pressure chamber does not exceed the biasing pressure applied by said back-pressure means, said substantially central aperture will be closed by said second flap valve, and said high-pressure inlet orifice will be open, and when the pressure differential between said high-pressure chamber and said low-pressure chamber exceeds the biasing pressure applied by said back-pressure means, said first flap valve will close said high-pressure inlet orifice, and whereby after said high-pressure inlet orifice is closed, a decrease in the low pressure causes (1) said pressure-sensitive means to separate from said second flap valve, (2) the pressure in said high-pressure and low-pressure chambers to equilibrate, and (3) said pressure-sensitive member to make renewed contact with said second flap valve to close said central aperture, while an increase in the low pressure, or a decrease in the high pressure, causes said high-pressure inlet orifice to reopen.

11. Apparatus as recited in claim 10 wherein said extension which is attached to said first and second flap valves slides in a guide attached to said housing.

12. An apparatus for protecting a differential pressure sensor from exceeding a maximum allowable differential pressure comprising:
    (a) a housing having a low-pressure chamber and a high-pressure chamber;
    (b) a pressure-sensitive member separating said high-pressure chamber and said low-pressure chamber;
    (c) first means for blocking the entrance of fluid into said high-pressure chamber in response to said pressure-sensitive member sensing an initial differential pressure between said high-pressure chamber and said low-pressure chamber exceeding the maximum allowable differential pressure; and
    (d) equilibration means for creating a hysteresis loop as to the magnitude of the differential pressure between said high-pressure chamber and said low-pressure chamber, said equilibration means allowing communication between said high-pressure chamber and said low-pressure chamber responsive to said pressure-sensitive member sensing a further increase in the differential pressure between said high-pressure chamber and said low-pressure chamber after said first blocking means has blocked the entrance of fluid into said high-pressure chamber, and shutting off said communication when the differential pressure between said high-pressure chamber and said low-pressure chamber drops to a level slightly less than the maximum allowable differential pressure.

13. Apparatus as recited in claim 12 wherein said equilibration means includes a substantially central aperture in said pressure-sensitive member and a bore through a pushbutton which has one end attached to said pressure-sensitive member and another end projecting into said high-pressure chamber, said bore being axially aligned with and in communication with said substantially central aperture, whereby after said first blocking means has blocked the entrance of fluid into said high-pressure chamber, a decrease in the pressure in said low-pressure chamber results, initially, in said pushbutton lifting off said first blocking means to allow communication between said low-pressure chamber and said high-pressure chamber through said substantially central aperture and said bore in said pushbutton, and a decrease in the differential pressure between said high-pressure chamber and said low-pressure chamber, and subsequently, after said communication has caused the pressure differential between said high-pressure chamber and said low-pressure chamber to drop slightly below the maximum allowable differential pressure, in said pushbutton resuming contact with said first blocking means to shut off said communication.

14. Apparatus as recited in claim 12 wherein said equilibration means comprises a substantially central aperture in said pressure-sensitive member and second blocking means for blocking said substantially central aperture, whereby after said first blocking means has blocked said high-pressure chamber inlet orifice, a decrease in the pressure in said low-pressure chamber results, initially, in said substantially central aperture lifting off said second blocking means to allow communication between said low-pressure chamber and said high-pressure chamber through said substantially central aperture, and a decrease in the differential pressure between said high-pressure chamber and said low-pressure chamber, and subsequently, after the pressure differential between said high-pressure chamber and said low-pressure chamber has dropped slightly below the maximum allowable differential pressure, in said pressure-sensitive member resuming contact with said second blocking means to close said substantially central aperture and shut off communication between said high-pressure chamber and said low-pressure chamber.

15. Apparatus as recited in claim 14 further comprising an elongated member having one end attached to said first blocking means and its other end attached to said second blocking means.

16. Apparatus as recited in claim 15 wherein said elongated member is slidably disposed in a guide attached to said housing.

17. An apparatus for protecting a differential pressure sensor from exceeding a maximum allowable differential pressure comprising:
    (a) a housing having a low-pressure chamber and a high-pressure chamber;
    (b) a pressure-sensitive member separating said high-pressure chamber and said low-pressure chamber;
    (c) first means for blocking the entrance of fluid into said high-pressure chamber in response to said pressure sensitive member sensing an initial differential pressure between said high-pressure chamber and said low-pressure chamber exceeding the maximum allowable differential pressure, said first means for blocking being subject to a first biasing means and a second biasing means, wherein said first biasing means biases said first blocking means away from a high-pressure chamber inlet orifice associated with said high-pressure chamber when said pressure-sensitive member has sensed no initial pressure differential between said high-pressure chamber and said low-pressure chamber in excess of the maximum allowable differential pressure, and said second biasing means biases said first blocking means to close said high-pressure chamber inlet orifice after said pressure-sensitive member has sensed an initial differential pressure between said high-pressure and low-pressure chambers in excess of the maximum allowable differential pressure; and
    (d) equilibration means for creating a hysteresis loop as to the magnitude of the differential pressure between said high-pressure chamber and said low-pressure chamber, said equilibration means allowing communication between said high-pressure chamber and said low-pressure chamber responsive to said pressure-sensitive member sensing a further increase in the differential pressure between said high-pressure chamber and said low-pressure chamber after said first blocking means has blocked said high-pressure chamber inlet orifice, and shutting off said communication when the differential pressure between said high-pressure chamber and said low-pressure chamber drops to a level slightly less than the maximum allowable differential pressure.

18. Apparatus as recited in claim 17 wherein said equilibration means includes a substantially central aperture in said pressure-sensitive member and a bore through said pushbutton, said bore being axially aligned with and in communication with said substantially central aperture, whereby after said first flap valve has blocked said high-pressure chamber inlet orifice, a decrease in the pressure in said low-pressure chamber results, initially, in said pushbutton lifting off said flap valve to allow communication between said low-pressure chamber and said high-pressure chamber through said substantially central aperture and said bore in said pushbutton, and a decrease in the differential pressure between said high-pressure chamber and said low-pressure chamber, and subsequently, after said communication has caused the pressure differential between said high-pressure chamber and said low-pressure chamber to drop slightly below the maximum allowable differential pressure, in said pushbutton resuming contact with said first flap valve to shut off said communication.

19. An apparatus for protecting a differential pressure sensor from exceeding a maximum allowable differential pressure comprising:
   (a) a housing having a low-pressure chamber and a high-pressure chamber;
   (b) a pressure-sensitive member separating said high-pressure chamber and said low-pressure chamber;
   (c) first means for blocking the entrance of fluid into said high-pressure chamber in response to said pressure-sensitive member sensing an initial differential pressure between said high-pressure chamber and said low-pressure chamber exceeding the maximum allowable differential pressure, said first means for blocking being subject to a first biasing means and a second biasing means, wherein said first biasing means biases said first blocking means away from a high-pressure chamber inlet orifice associated with said high-pressure chamber when said pressure-sensitive member has sensed no initial pressure differential between said high-pressure chamber and said low-pressure chamber in excess of the maximum allowable differential pressure, and said second biasing means biases said first blocking means to close said high-pressure chamber inlet orifice after said pressure-sensitive member has sensed an initial differential pressure between said high-pressure and low-pressure chambers in excess of the maximum allowable differential pressure, said first means for blocking comprising a first flap valve, said first biasing means including back-pressure means which applies pressure on said pressure-sensitive member having a magnitude substantially equal to the maximum allowable pressure differential, and an elongated member having one end attached to said first flap valve and its other end disposed to contact said pressure-sensitive member when no initial pressure differential between said high-pressure chamber and said low-pressure chamber in excess of the maximum allowable differential pressure has been sensed, such that said elongated member biases said first flap valve away from the high-pressure chamber inlet orifice when said pressure-sensitive member has not sensed an initial pressure differential between said high-pressure chamber and said low-pressure chamber greater than the maximum allowable pressure differential, and said second biasing means comprises forward-pressure means which applies pressure on said first flap valve having a magnitude which is insignificant in comparison with the pressure applied by said first biasing means such that said second biasing means biases said first flap valve to close said high-pressure chamber inlet orifice only when the differential pressure between said high-pressure chamber and said low-pressure chamber at least substantially equals the pressure applied by said first biasing means; and
   (d) equilibration means for creating a hysteresis loop as to the magnitude of the pressure differential between said high-pressure chamber and said low-pressure chamber, said equilibration means allowing communication between said high-pressure chamber and said low-pressure chamber responsive to said pressure-sensitive member sensing a further increase in the differential pressure between said high-pressure chamber and said low-pressure chamber after said first blocking means has blocked said high-pressure chamber inlet orifice, and shutting off said communication when the differential pressure between said high-pressure chamber and said low-pressure chamber drops to a level slightly less than the maximum allowable differential pressure.

20. Apparatus as recited in claim 19 wherein said equilibration means comprises a substantially central aperture in said pressure-sensitive member and second blocking means for blocking said substantially central aperture, whereby after said first flap valve has blocked said high-pressure chamber inlet orifice, a decrease in the pressure in said low-pressure chamber results, initially, in said substantially central aperture lifting off said second blocking means to allow communication between said low-pressure chamber and said high-pressure chamber through said substantially central aperture, and a decrease in the differential pressure between said high-pressure chamber and said low-pressure chamber, and subsequently, after the pressure differential between said high-pressure chamber and said low-pressure chamber has dropped slightly below the maximum allowable differential pressure, in said pressure-sensitive member resuming contact with said second blocking means to close said substantially central aperture and shut off communication between said high-pressure chamber and said low-pressure chamber.

21. Apparatus as recited in claim 20 wherein said second blocking means comprises a second flap valve.

22. Apparatus as recited in claim 21 wherein said elongated member slides in a guide attached to said housing.

* * * * *